(12) United States Patent
Zhang et al.

(10) Patent No.: US 12,320,826 B1
(45) Date of Patent: Jun. 3, 2025

(54) SINGLE-MOLECULE FORCE SPECTROSCOPY-INFRARED SPECTROSCOPY (SMFS-IR) COUPLING METHOD AND SYSTEM, AND DEVICE

(71) Applicant: Jilin University, Changchun (CN)

(72) Inventors: Wenke Zhang, Changchun (CN); Ziwen Ma, Changchun (CN); Yuanfei Jiang, Changchun (CN); Wei Feng, Changchun (CN); Yu Song, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/968,553

(22) Filed: Dec. 4, 2024

(30) Foreign Application Priority Data

Dec. 5, 2023 (CN) .......................... 202311648024.3

(51) Int. Cl.
*G01Q 20/02* (2010.01)
(52) U.S. Cl.
CPC .................................. *G01Q 20/02* (2013.01)
(58) Field of Classification Search
CPC ....................................................... G01Q 20/02
See application file for complete search history.

(56) References Cited

U.S. PATENT DOCUMENTS

| | | | | |
|---|---|---|---|---|
| 2019/0120753 | A1* | 4/2019 | Prater | G01N 21/59 |
| 2020/0408806 | A1* | 12/2020 | Bhargava | G01Q 60/38 |
| 2021/0156862 | A1* | 5/2021 | Holman | G01N 33/57449 |
| 2024/0044782 | A1* | 2/2024 | Prater | G01J 3/45 |

FOREIGN PATENT DOCUMENTS

| | | |
|---|---|---|
| CN | 110050193 A | 7/2019 |
| CN | 110121644 A | 8/2019 |
| CN | 110168383 A | 8/2019 |

(Continued)

OTHER PUBLICATIONS

Jin, M., Lu, F., & Belkin, M. A. (Jul. 28, 2017). High-sensitivity infrared vibrational nanospectroscopy in water. Light: Science & Applications, 6(7), e17096-e17096.

(Continued)

*Primary Examiner* — Nicole M Ippolito
(74) *Attorney, Agent, or Firm* — Tutunjian & Bitetto, P.C.

(57) ABSTRACT

Provided is a single-molecule force spectroscopy-infrared spectroscopy (SMFS-IR) coupling method and system, and a device, relating to the field of SMFS. An optical path system module obtains and sends a deflection signal of a cantilever. A lock-in amplifier obtains a resonance frequency. A processor module assigns the resonance frequency as a pulse repetition frequency to a signal generator. Co-frequency electrical signals are generated. A trigger signal is transmitted to an infrared laser. A reference signal is transmitted to the lock-in amplifier. A photothermal detector converts a laser intensity into laser power. The lock-in amplifier demodulates the deflection signal of the cantilever to obtain a cantilever amplitude. The processor module obtains an amplitude-wavenumber curve. Original SMFS-IR data of a sample under test is obtained. The original SMFS-IR data of the sample under test is divided by the laser power, and a photoacoustic noise is removed to obtain a real detection result.

12 Claims, 9 Drawing Sheets

(56) References Cited

FOREIGN PATENT DOCUMENTS

| CN | 110234982 A | 9/2019 |
|---|---|---|
| CN | 110234982 B | 7/2022 |
| CN | 115015265 A | 9/2022 |
| CN | 116819127 A | 9/2023 |
| CN | 117629929 A | 3/2024 |

OTHER PUBLICATIONS

Xie, Q., & Xu, X. G. (Nov. 23, 2022). Fourier-transform atomic force microscope-based photothermal infrared spectroscopy with broadband source. Nano Letters, 22(22), 9174-9180.
First Office Action in Chinese Application No. 202311648024.3 dated Nov. 27, 2024.
Chinese Patent Application No. 202311648024.3, published Mar. 1, 2024.
Notification of Patent Grant Application No. 202311648024.3, issued Jan. 3, 2025.

* cited by examiner

| Utilize a cantilever to sense and amplify an interaction force between a sharp tip on a cantilever and a polymer molecule under test, to obtain and send a deflection signal of the cantilever | S1 |

| Calculate a resonance frequency from the deflection signal through FFT; and assign the resonance frequency as a pulse repetition frequency to a signal generator | S2 |

| The signal generator generates co-frequency electrical signals based on the pulse repetition frequency; transmits the co-frequency electrical signal as a trigger signal to an infrared laser in an optical path system module; and transmits the co-frequency electrical signal as a reference signal to a lock-in amplifier | S3 |

| Convert a received laser intensity into laser power when collecting background data of the infrared laser | S4 |

| Demodulate the deflection signal of the cantilever according to the reference signal, to obtain a cantilever amplitude, and transmit the cantilever amplitude to the processor module, where the cantilever amplitude represents original spectrum data | S5 |

| Obtain an amplitude-wavenumber curve according to the cantilever amplitude and the laser power; divide the amplitude-wavenumber curve by the background data of the infrared laser, and perform gain adjustment according to a radiation intensity of the infrared laser at each wavenumber segment, to obtain SMFS-IR data of a sample under test | S6 |

FIG. 2

Connected to a target molecule

Not connected to a molecule

SINGLE-MOLECULE FORCE SPECTROSCOPY-INFRARED SPECTROSCOPY (SMFS-IR) COUPLING METHOD AND SYSTEM, AND DEVICE

CROSS REFERENCE TO RELATED APPLICATION

This patent application claims the benefit and priority of Chinese Patent Application No. 202311648024.3, filed with the China National Intellectual Property Administration on Dec. 5, 2023, the disclosure of which is incorporated by reference herein in its entirety as part of the present application.

TECHNICAL FIELD

The present disclosure relates to the technical field of single-molecule force spectroscopy (SMFS), and in particular, to a single-molecule force spectroscopy-infrared spectroscopy (SMFS-IR) coupling method and system, and a device.

BACKGROUND

The atomic force spectroscopy (AFM)-based SMFS technique allows for stretching a single polymer using an AFM tip. By recording the deformation of and the mechanical force on the stretched polymer molecule, rich physicochemical information can be obtained. This technique enables precise studies at the single-molecule level of polymer mechanochemistry, semi-crystalline polymer force-induced melting, supramolecular assembly, and interactions between biomolecules such as protein-protein and protein-DNA.

An AFM probe consists of a cantilever and a tip, which are used to stretch polymer molecules and detect the vibrations. Fast Fourier transform (FFT) is an efficient algorithm for discrete Fourier transform (DFT), converting time-domain signals into frequency-domain signals. Mechanochemical reactions refer to the chemical reactions corresponding to the breaking of old chemical bonds and the formation of new chemical bonds induced by mechanical forces. B-sheet is a state that polypeptide chains in proteins can exist in, characterized by parallel arrangements of peptide segments held together by hydrogen bonds, forming a folded structure that can unfold into a linear structure under the external force.

Combining SMFS technique with fluorescence microscopy or fluorescence spectroscopy allows for the mechanical manipulation of a single molecule while directly detecting single-molecule fluorescence. Professors Hermann E. Gaub from Germany, Julio M. Fernández from the United States, and Martin Vacha from Japan have established related technologies, achieving techniques such as single-molecule cut-and-paste, energy measurement of the evanescent field at the total internal reflection interface, and detection of the single-molecule fluorescence behavior of conjugated polymer aggregates. The technical development of in situ analysis of the target molecule in SMFS using fluorescence microscopy or fluorescence spectroscopy has continued without pause over the past 20 years.

Recently, AFM-based infrared spectroscopy has seen sustained development. This technique involves illuminating the AFM sample surface with a modulated infrared beam and using the AFM probe as a spectrum detector, enhancing the resolution of infrared imaging from the micrometer to the nanometer scale. Initially proposed by Professor Alexandre Dazzi, this technique has found extensive application in the analysis of polymer structures.

The combination of AFM and spectroscopy techniques has achieved significant breakthroughs, greatly advancing scientific progress across various fields. However, the research on force-induced structural transformations has received insufficient attention. Currently, most AFM-infrared spectroscopy technologies merely detect vibrations caused by light excitation through the downward pressure of the AFM tip, making it challenging to establish quantitative relationships between external forces and the kinetics of mechanochemical reactions, thereby failing to meet the needs for in-depth exploration of microscopic mechanochemistry. The SMFS method can in situ manipulate individual polymer molecules. Repeating units containing mechanophores connected in a sequential manner, ensuring uniformity in the forces experienced by these mechanophores. However, during the experiment, only the length changes and mechanical forces from the single molecule can be measured, without directly identifying the chemical changes or supramolecular structural changes occurring within the molecules. The combination of SMFS and fluorescence microscopy/fluorescence spectroscopy can only monitor structural changes in light-responsive molecules without directly indicating changes in chemical bonds.

In terms of instrumentation, the instrument and control system of commercial AFM infrared spectrometers are primarily designed for infrared imaging experiments, utilizing open-loop scanners as the motion control module for the AFM probe, resulting in insufficient repositioning accuracy of the AFM probe. Additionally, the quality of the infrared laser beam is poor, and there is insufficient laser energy near the AFM tip to excite single-molecule vibrations. The control system is unable to operate the AFM probe for complex motions, making it difficult to conduct intricate SMFS experiments. These limitations hinder commercial AFM infrared spectrometers from meeting the SMFS testing needs.

In July 2017, Professor Mikhail A. Belkin from the University of Texas at Austin and his team reported a method for obtaining atomic force microscopy-infrared (AFM-IR) signals in water, demonstrating the ability to collect weak AFM-IR signals. However, this research group constructed a total internal reflection optical path using a germanium prism, which precludes the use of visible light as a guiding laser light, complicating the precise alignment of the infrared beam with the AFM tip.

In November 2022, Xiaoji G. Xu (Lehigh University) et al. published research demonstrating a Fourier transform AFM-IR technique via normal incidence (Nano Lett. 2022, 22, 9174-9180). This technique used an AFM with a closed-loop scanner as the motion control module for the AFM tip, but it could not achieve multi-level force clamping through force spectrum programming functionality.

In May 2022, Xia Xinghua et al. from Nanjing University submitted a patent for "NANOSCALE SUBSURFACE INFRARED IMAGING METHOD" which achieved nanoscale infrared imaging of subsurfaces using surface enhancement techniques. However, the instrument design of the invention employed a normal incidence infrared laser light introduction method, leading to extremely strong photoacoustic noises and failing to meet the high precision and signal-to-noise ratio required for SMFS-IR data collection.

In May 2023, Wang Hailong et al. from Xiamen University submitted a patent for "APPARATUS AND METHOD FOR OBTAINING INFRARED, ELECTRICAL, AND MECHANICAL IMAGING OF NANOMATERIALS", which allows for infrared imaging while testing surface modulus and electrochemical properties of samples. However, the infrared optical path used in the invention differs from that of the present disclosure, resulting in the electric vector orientation of the infrared laser light being perpendicular to the detection direction of the AFM probe, making it difficult to directly induce vibrations in target molecules and thereby collect SMFS-IR signals.

SUMMARY

The objective of the embodiments of the present disclosure is to provide an SMFS-IR coupling method and system, and a device. A mathematical method is utilized to remove photoacoustic signals and the force spectrum is programed to achieve multi-level force clamping functionality, thereby improving the accuracy and signal-to-noise ratio of the AFM infrared spectrometer.

To achieve the above objective, the embodiments of the present disclosure provide the following technical solutions:

An SMFS-IR coupling system includes:

an optical path system module configured to utilize a cantilever to sense and amplify an interaction force between a sharp tip on a cantilever and a polymer molecule under test, to obtain and send a deflection signal of the cantilever;

a lock-in amplifier connected to the optical path system module and configured to calculate a resonance frequency from the deflection signal through FFT;

a processor module connected to the lock-in amplifier and configured to assign the resonance frequency as a pulse repetition frequency to a signal generator;

the signal generator connected to the processor module and configured to:

generate co-frequency electrical signals based on the pulse repetition frequency;

transmit the co-frequency electrical signal as a trigger signal to an infrared laser in the optical path system module; and transmit the co-frequency electrical signal as a reference signal to the lock-in amplifier; and a photothermal detector separately connected to the infrared laser in the optical path system module and the lock-in amplifier and configured to:

convert a received laser intensity into laser power when collecting background data of the infrared laser; and transmit the laser power to the lock-in amplifier, where the lock-in amplifier transmits the laser power to the processor module; and the lock-in amplifier is further configured to: demodulate the deflection signal of the cantilever according to the reference signal, to obtain a cantilever amplitude, and transmit the cantilever amplitude to the processor module, where the cantilever amplitude represents original spectrum data; and the processor module obtains an amplitude-wavenumber curve according to the cantilever amplitude and the laser power; divides the amplitude-wavenumber curve by the background data of the infrared laser, and performs gain adjustment according to a radiation intensity of the infrared laser at each wavenumber segment, to obtain SMFS-IR data of a sample under test.

Optionally, the optical path system module specifically includes:

the infrared laser configured to emit infrared laser light;

a guiding laser light emitter configured to emit guiding laser light;

a plane mirror unit disposed in an optical path of the infrared laser light and configured to control a spatial position of the infrared laser light;

a beam combiner disposed in a common optical path of the infrared laser light and the guiding laser light and configured to adjust the guiding laser light and the infrared laser light to be collinear, to obtain collinear laser light;

a reflective beam expander disposed in an optical path of the collinear laser light and configured to expand the collinear laser light, to obtain N-fold expanded laser light; and an off-axis parabolic mirror movable in three-dimensional space, disposed in an optical path of the expanded laser light, and configured to focus the N-fold expanded laser light onto a surface of an infrared-transparent prism carrying the sample under test, where the infrared-transparent prism includes at least a zinc selenide infrared-transparent glass, a zinc sulfide infrared-transparent glass, a calcium fluoride infrared-transparent glass, a magnesium fluoride infrared transparent glass, or a potassium bromide infrared-transparent glass.

Optionally, the optical path system module further includes:

a turning mirror disposed in the optical path of the collinear laser light and configured to directly reflect the collinear laser light to the photothermal detector.

Optionally, the original spectrum data is collected when the sharp tip is connected to a target molecule of the sample under test; after the collection is completed, the target molecule is ruptured, and the sharp tip is controlled to move to a position for spectral signal collection, to collect signals again and obtain a pure photoacoustic noise; and the original spectrum data and the pure photoacoustic noise are normalized, and subtraction is performed to obtain the SMFS-IR data with the photoacoustic noise removed.

Optionally, after the sharp tip is connected to the target molecule of the sample under test, a first clamping force is preset; when a force on the sharp tip reaches the first clamping force, a process of moving the sharp tip away is stopped, and the sharp tip is held in place;

during the holding phase, the sharp tip performs intervention of the infrared laser light and collects infrared spectrum data; and after completing the collection of the infrared spectrum data, the sharp tip continues to move away from the target molecule of the sample under test until the target molecule is ruptured.

Optionally, for a target molecule with mechanochemical response, an M-level clamping force is preset after the sharp tip is connected to the target molecule of the sample under test, specifically including:

when the force on the sharp tip reaches the first clamping force and the sharp tip undergoes a first holding phase, continuing operation steps of a second stretching phase and a second holding phase; if a mechanochemical reaction is triggered during the second stretching phase, setting a second clamping force during the second holding phase to be equal in magnitude to the first clamping force during the first holding phase; and performing, by the sharp tip, intervention of the infrared laser light and collecting the infrared spectrum data during both the first holding phase and the second holding phase, to obtain an in situ mechanochemical identification result.

To achieve the above objective, the embodiments of the present disclosure further provide the following technical solutions:

An SMFS-IR coupling method includes:

utilizing a cantilever to sense and amplify an interaction force between a sharp tip on a cantilever and a polymer molecule under test, to obtain and send a deflection signal of the cantilever;

calculating a resonance frequency from the deflection signal through FFT; and assigning the resonance frequency as a pulse repetition frequency to a signal generator;

generating, by the signal generator, co-frequency electrical signals based on the pulse repetition frequency; transmitting the co-frequency electrical signal as a trigger signal to an infrared laser in the optical path system module; and transmitting the co-frequency electrical signal as a reference signal to the lock-in amplifier;

converting a received laser intensity into laser power when collecting background data of the infrared laser;

demodulating the deflection signal of the cantilever according to the reference signal, to obtain a cantilever amplitude, and transmitting the cantilever amplitude to a processor module, where the cantilever amplitude represents original spectrum data; and obtaining an amplitude-wavenumber curve according to the cantilever amplitude and the laser power; dividing the amplitude-wavenumber curve by the background data of the infrared laser, and performing gain adjustment according to a radiation intensity of the infrared laser at each wavenumber segment, to obtain SMFS-IR data of a sample under test.

An electronic device includes a memory, a processor, and a computer program stored in the memory and executable in the processor. The processor executes the computer program to implement the SMFS-IR coupling method.

A non-transient computer-readable storage medium stores a computer program. The computer program is executed to implement the SMFS-IR coupling method.

In the embodiments of the present disclosure, an AFM device with a closed-loop scanner is first used in conjunction with an infrared laser, and an AFM infrared spectrometer with high precision and high signal-to-noise ratio is constructed using laser beam expansion and a high numerical aperture focusing optical path. Subsequently, a novel SMFS testing method is established. While obtaining SMFS data, infrared laser light is used to excite vibration of a target molecule, and single-molecule infrared signals are collected simultaneously. The chemical sensitivity of infrared spectrum is utilized to address the technical limitation that the SMFS cannot directly obtain the chemical information of the sample under test.

BRIEF DESCRIPTION OF THE DRAWINGS

To describe the technical solutions in the embodiments of the present disclosure or in the prior art more clearly, the accompanying drawings required in the embodiments are briefly described below. Apparently, the accompanying drawings in the following description show merely some embodiments of the present disclosure, and other drawings can still be derived from these accompanying drawings by those of ordinary skill in the art without creative efforts.

FIG. 2 is a schematic flowchart of an SMFS-IR coupling method according to an embodiment of the present disclosure;

REFERENCE NUMERALS

Optical path system module—1, lock-in amplifier—2, processor module—3, signal generator—4, and photothermal detector—6.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

The objective of the embodiments of the present disclosure is to provide an SMFS-IR coupling method and system, and a device, to resolve the problem that sample chemical information cannot be obtained in existing SMFS experiments.

In order to make the above objective, features and advantages of the present disclosure clearer and more comprehensible, the present disclosure will be further described in detail below in combination with accompanying drawings and particular implementation modes.

Figure 1:
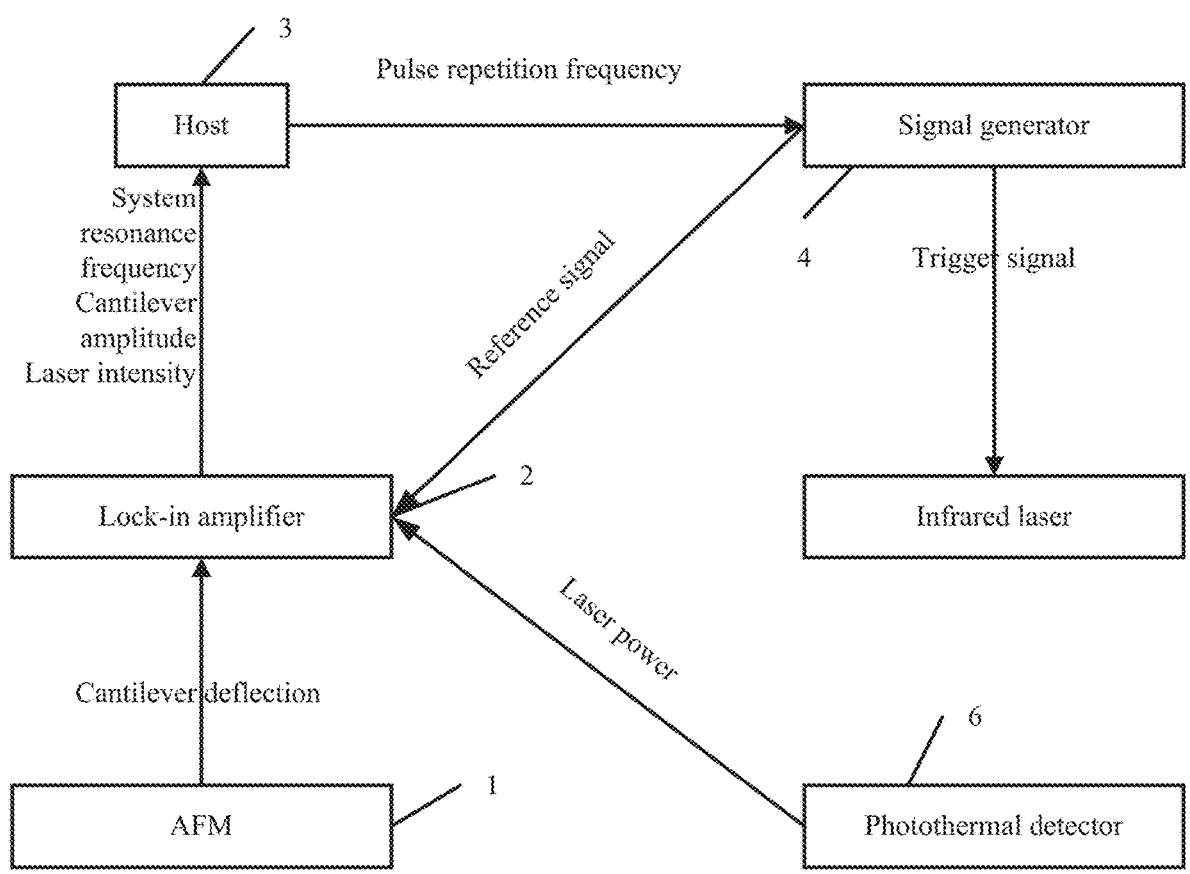
FIG. 1 is a schematic structural diagram of an SMFS-IR coupling system according to an embodiment of the present disclosure.

FIG. 1 shows an exemplary structure of an SMFS-IR coupling system. Each module is described in detail below.

An optical path system module 1 is configured to utilize a cantilever to sense and amplify an interaction force between a sharp tip on a cantilever and a polymer molecule under test, to obtain and send a deflection signal of the cantilever.

Figure 3:
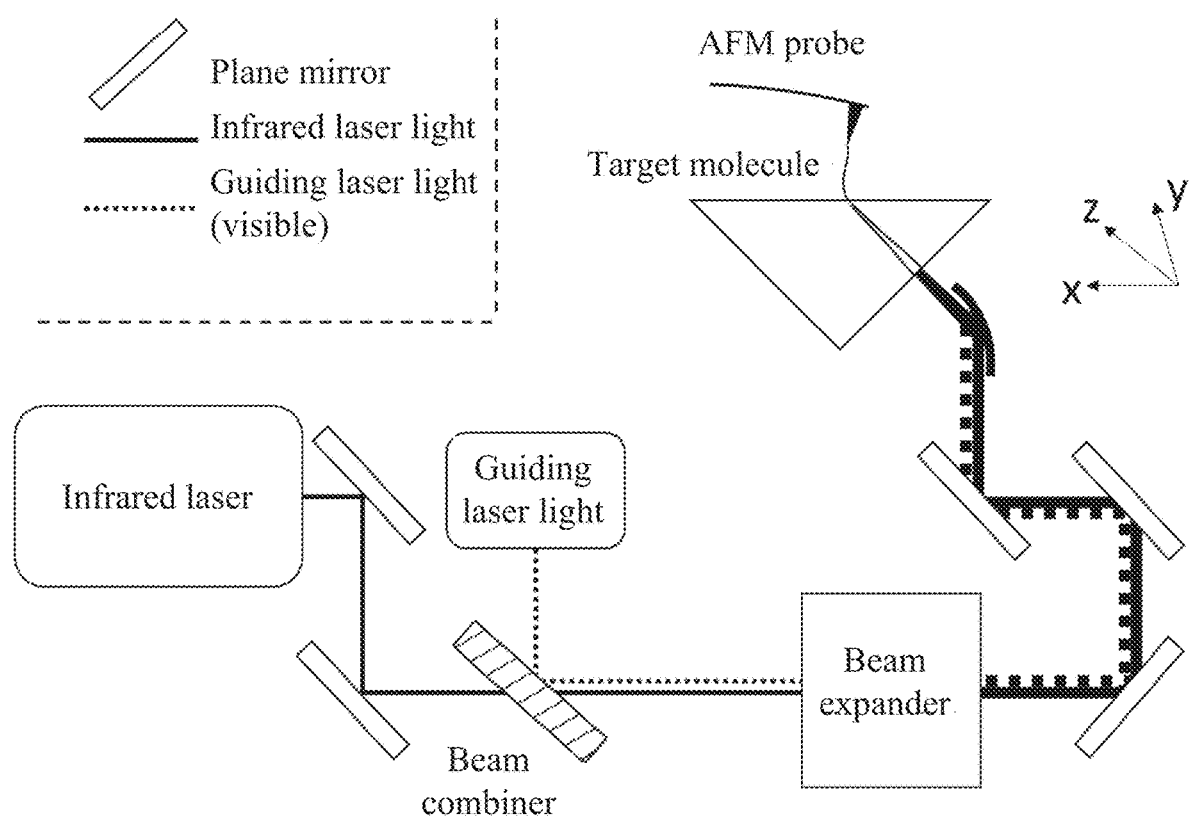
FIG. 3 is a schematic structural diagram of an SMFS-IR signal collection optical path system according to an embodiment of the present disclosure.
Figure 4:
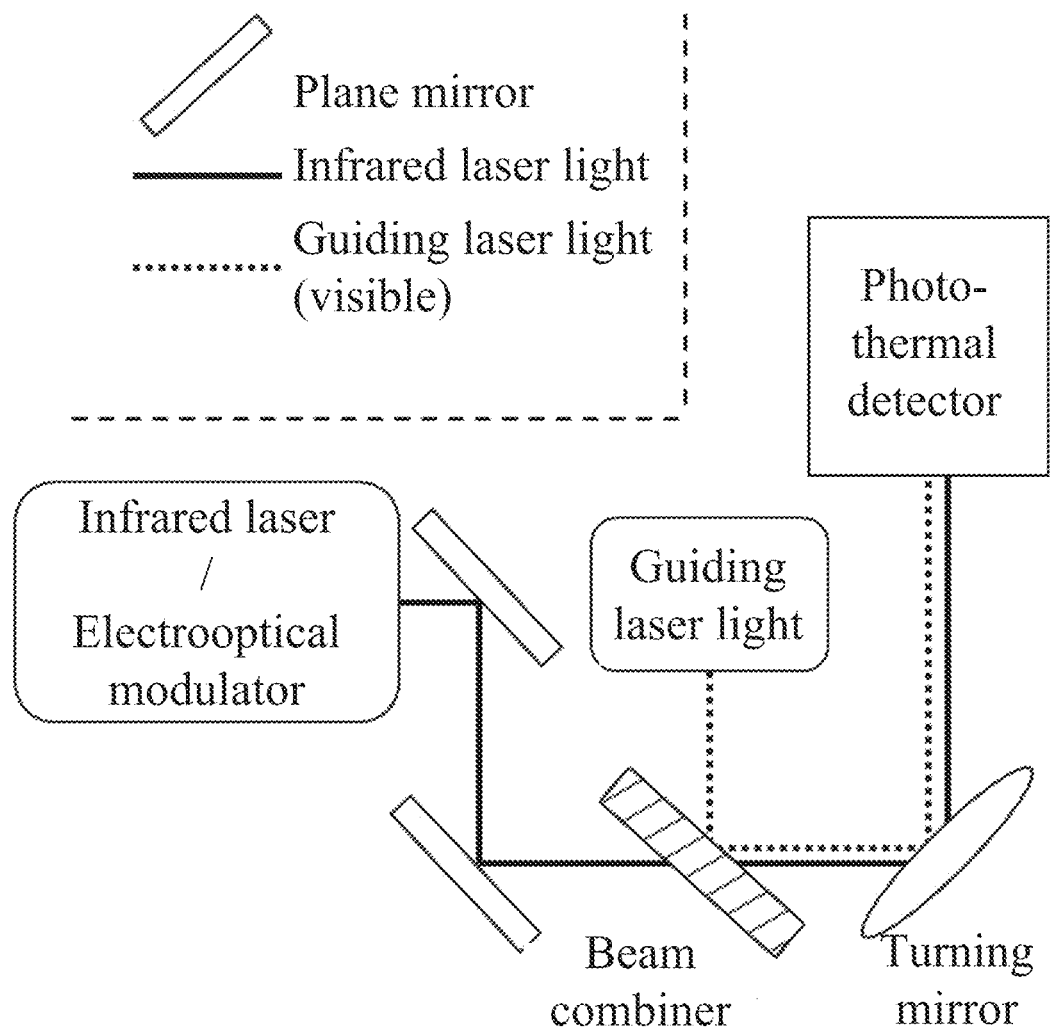
FIG. 4 is a schematic diagram of a laser background collection optical path system according to an embodiment of the present disclosure.

Referring to FIG. 3 and FIG. 4, the optical path system module 1 specifically includes: an infrared laser configured to emit infrared laser light;

- a guiding laser light emitter configured to emit guiding laser light;
- a plane mirror unit disposed in an optical path of the infrared laser light and configured to control a spatial position of the infrared laser light;
- a beam combiner disposed in a common optical path of the infrared laser light and the guiding laser light and configured to adjust the guiding laser light and the infrared laser light to be collinear, to obtain collinear laser light;
- a reflective beam expander disposed in an optical path of the collinear laser light and configured to expand the collinear laser light, to obtain N-fold expanded laser light;
- an off-axis parabolic mirror movable in three-dimensional space, disposed in an optical path of the expanded laser light, and configured to focus the N-fold expanded laser light onto a surface of an infrared-transparent prism carrying the polymer molecule under test, where the infrared-transparent prism includes at least a zinc selenide infrared-transparent glass, a zinc sulfide infrared-transparent glass, a calcium fluoride infrared-transparent glass, a magnesium fluoride infrared transparent glass, or a potassium bromide infrared-transparent glass; and
- a turning mirror disposed in the optical path of the collinear laser light and configured to directly reflect the collinear laser light to the photothermal detector.

In an example, A plane mirrors are used to control the spatial position of the laser light, the beam combiner is used to adjust the guiding laser light (visible light) and the infrared laser light (invisible to the naked eye) to be collinear, the reflective beam expander is used to expand the beam by 6 folds, and finally the off-axis parabolic mirror movable in three-dimensional space is used to focus the laser beam onto the surface of the infrared-transparent prism carrying the sample. In the system, the reflective beam expander can be replaced by a pair of off-axis parabolic mirrors with coincident focal points, and the infrared-transparent prism may be a zinc selenide, zinc sulfide, calcium fluoride, magnesium fluoride, potassium bromide or another infrared-transparent glass. Because the infrared laser has an emission background, the turning mirror can be used to directly reflect the infrared laser light to the photothermal detector, thus detecting an emission background signal of the laser. For example, the value of A may be 2, 3, or 4, and details are not described herein.

A lock-in amplifier 2 is connected to the optical path system module 1 and is configured to calculate a resonance frequency from the deflection signal through FFT.

A processor module 3 is connected to the lock-in amplifier 2 and is configured to assign the resonance frequency as a pulse repetition frequency to a signal generator.

The signal generator 4 is connected to the processor module 3 and is configured to:

- generate co-frequency electrical signals based on the pulse repetition frequency;
- transmit the co-frequency electrical signal as a trigger signal to the infrared laser in the optical path system module 1; and
- transmit the co-frequency electrical signal as a reference signal to the lock-in amplifier 2.

The photothermal detector 6 is separately connected to the infrared laser in the optical path system module 1 and the lock-in amplifier 2 and is configured to:

- convert a received laser intensity into laser power when collecting background data of the infrared laser; and
- transmit the laser power to the lock-in amplifier 2, where the lock-in amplifier 2 transmits the laser power to the processor module 3.

The lock-in amplifier 2 is further configured to: demodulate the deflection signal of the cantilever according to the reference signal, to obtain a cantilever amplitude, and transmit the cantilever amplitude to the processor module 3, where the cantilever amplitude represents original spectrum data.

The original spectrum data is collected when the sharp tip is connected to a target molecule of the sample under test; after the collection is completed, the target molecule is ruptured, and the sharp tip is controlled to move to a position for spectral signal collection, to collect signals again and obtain a pure photoacoustic noise.

Then, the original spectrum data and the pure photoacoustic noise are normalized, and subtraction is performed to obtain the SMFS-IR data with the photoacoustic noise removed.

After the sharp tip is connected to the target molecule of the sample under test, a first clamping force is preset; when a force on the sharp tip reaches the first clamping force, a process of moving the sharp tip away is stopped, and the sharp tip is held in place;

- during the holding phase, the sharp tip performs intervention of the infrared laser light and collects infrared spectrum data; and
- after completing the collection of the infrared spectrum data, the sharp tip continues to move away from the target molecule of the sample under test until the target molecule is ruptured.

For a target molecule with mechanochemical response, an M-level clamping force is preset after the sharp tip is connected to the target molecule of the sample under test, specifically including:

- when the force on the sharp tip reaches the first clamping force and the sharp tip undergoes a first holding phase, continuing operation steps of a second stretching phase and a second holding phase; if a mechanochemical reaction is triggered during the second stretching phase, setting a second clamping force during the second holding phase to be equal in magnitude to the first clamping force during the first holding phase; and
- performing, by the sharp tip, intervention of the infrared laser light and collecting the infrared spectrum data during both the first holding phase and the second holding phase, to obtain an in situ mechanochemical identification result.

The processor module 3 obtains an amplitude-wavenumber curve according to the cantilever amplitude and the laser power; divides the amplitude-wavenumber curve by the background data of the infrared laser, and performs gain adjustment according to a radiation intensity of the infrared laser at each wavenumber segment, to obtain SMFS-IR data of the sample under test. After rupturing the polymer molecule under test, the cantilever is repositioned to the spatial position during collection of the SMFS-IR data, to collect a photoacoustic noise signal; and the original spectrum data and the pure photoacoustic noise are normalized, and subtraction is performed to obtain the SMFS-IR data with the photoacoustic noise removed.

Figure 5:
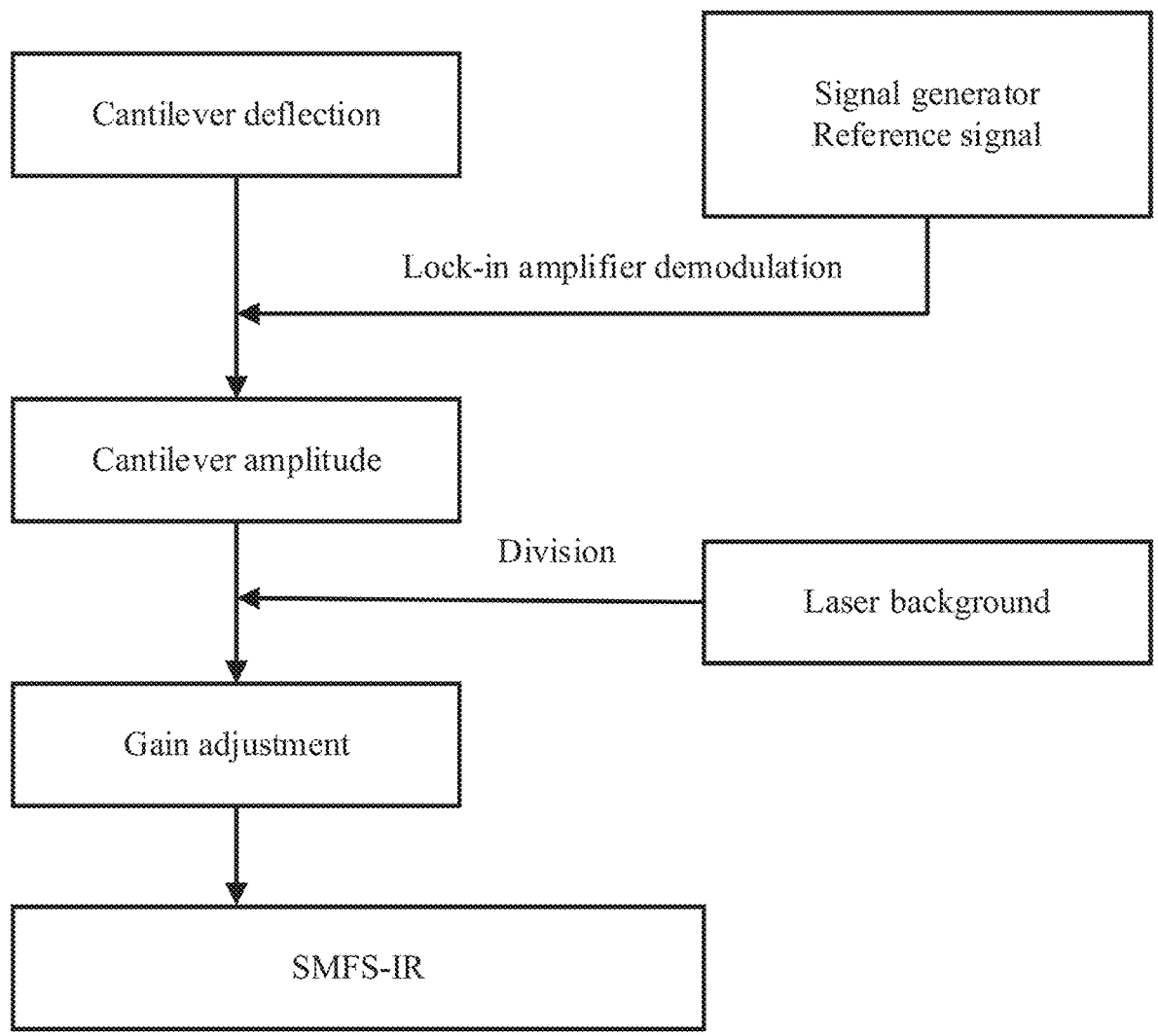
FIG. 5 is a schematic flowchart of data processing according to an embodiment of the present disclosure.

Referring to FIG. 5, an AFM system transmits the deflection signal of the cantilever to the lock-in amplifier, and the lock-in amplifier calculates the resonance frequency of the system through FFT and transmits the resonance frequency to the processor module 3 (the host). The host assigns the resonance frequency of the system as the pulse repetition frequency to the signal generator 4. The signal generator 4 generates co-frequency electrical signals according to the written data, and the co-frequency electrical signals are used as the trigger signal and the reference signal and transmitted to the infrared laser and the lock-in amplifier 2 respectively. The lock-in amplifier 2 demodulates the deflection signal of the cantilever according to the reference signal, to obtain the cantilever amplitude, and transmits the same to the host as the original spectrum data. When collecting the laser background, the photothermal detector 6 converts the received light intensity into an electrical signal (laser power) and transmits the same to the lock-in amplifier 2. Finally, the lock-in amplifier 2 transmits the electrical signal to the host as a laser intensity signal.

The data processing flow is as shown in FIG. 5 below. The laser background is collected by the photothermal detector and recorded in software. The lock-in amplifier 2 demodulates, according to the reference signal provided by the signal generator 4, the deflection signal of the cantilever collected by the AFM, to obtain the cantilever amplitude. The amplitude-wavenumber curve is divided by the background data of the laser, and gain adjustment is performed according to the radiation intensity of the infrared laser at each wavenumber segment, to obtain the SMFS-IR data of the sample.

Figure 6A:
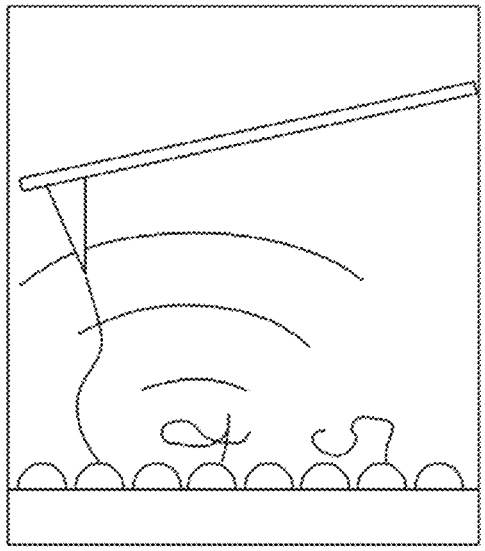
FIGS. 6A-6C are schematic diagrams of connecting and not connecting to a target molecule according to an embodiment of the present disclosure.
Figure 6B:
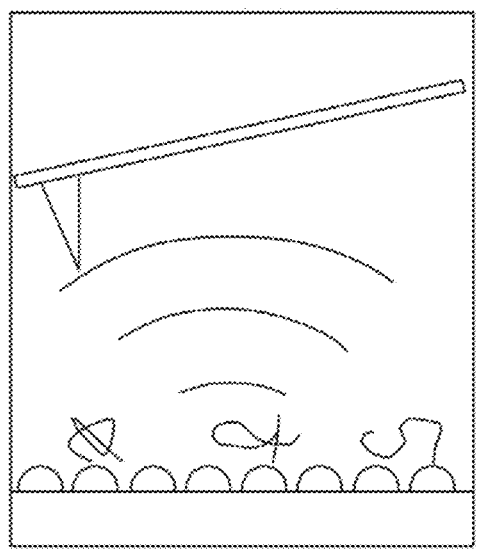
Figure 6C:
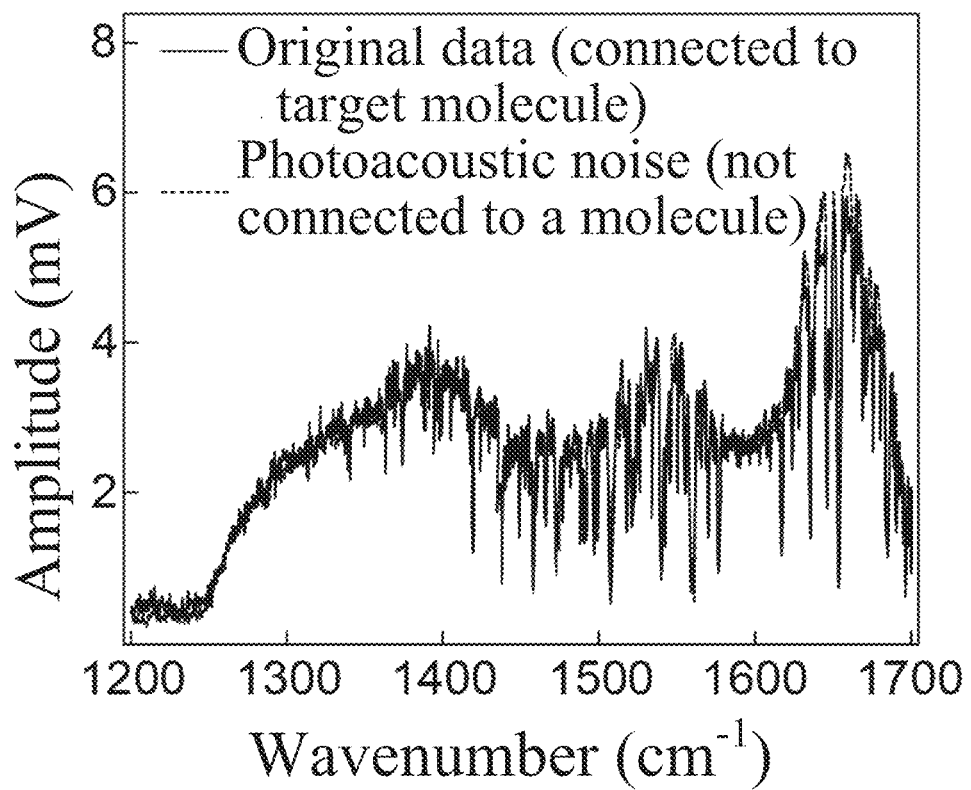

The process of photoacoustic noise removal is shown in FIGS. 6A-6C below. During the detection process, the photoacoustic noise signals interfere with the identification of single-molecule infrared signals, and the principle is that silver nanoparticles near the target molecule have scattering effect on the infrared laser light. The scattered infrared light heats the air under the probe, producing a periodically changing air layer. The air layer transmitted to the cantilever excites the cantilever to vibrate, and the amplitude is superimposed with the amplitude of the target molecule vibration, resulting in more complicated signals. To address the photoacoustic signal, the collected original spectrum data is processed using mathematical subtraction. That is, the original infrared spectrum signal is collected when the AFM probe is connected to the target molecule; after the collection is completed, the target molecule is ruptured, and the probe is controlled to move to a position (with the same X, Y, and Z spatial coordinates) for spectral signal collection, to collect signals again at the position and obtain a pure photoacoustic noise. After the collection, the two signals are normalized and then subtraction is performed, such that the photoacoustic noise can be removed mathematically.

The conventional SMFS collects data by using a constant-speed stretching method, the AFM probe approaches the sample at a constant speed. After the probe tip forms a connection with the target molecule, the AFM probe moves away from the sample surface at a constant speed, applying a mechanical force to the target molecule. However, this method continuously alters the resonance frequency of the serial system formed by the cantilever and the target molecule, making it impossible to complete the processes of resonance frequency collection and pulse repetition frequency assignment as described above.

Figure 7:
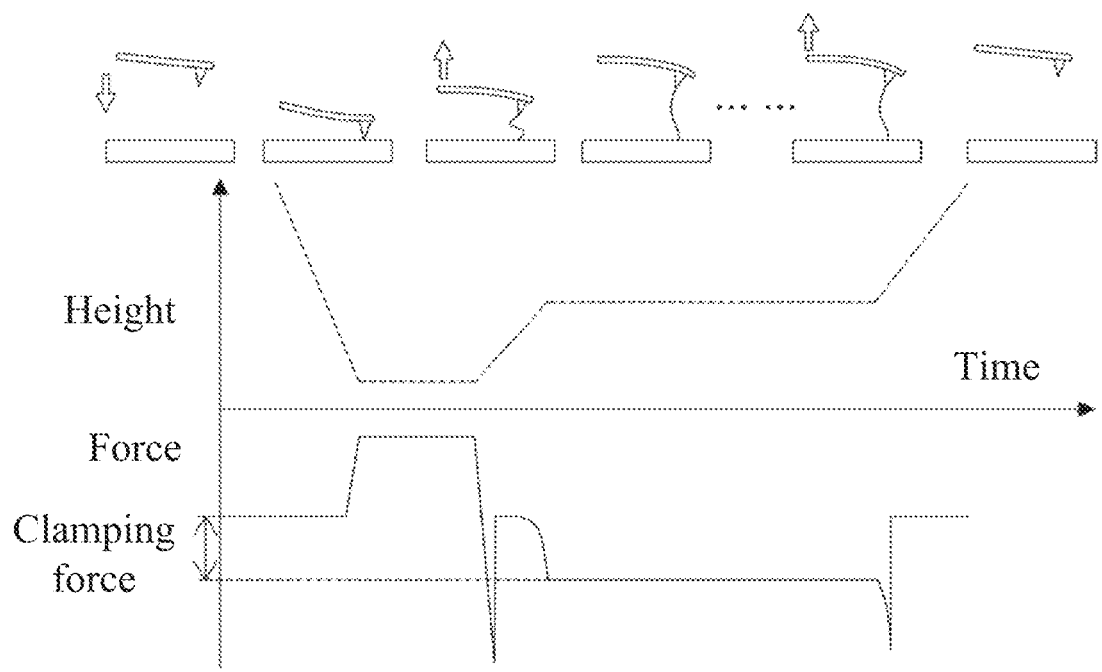
FIG. 7 is a schematic diagram of establishing a force spectrum programming functionality to achieve a force clamping working mode according to an embodiment of the present disclosure.

Referring to FIG. 7, the force spectrum programming functionality is established to implement the force clamp working mode. After the AFM probe forms a connection with the target molecule, a specific "first clamping force" is set. Once the force on the AFM probe reaches the first clamping force, the moving further process is stopped, and the probe is held in place. During the holding phase, infrared laser light intervention and infrared spectrum collection are performed. After completing the spectrum collection, the process of moving the probe away from the sample is continued until the target molecule is ruptured.

Figure 8:
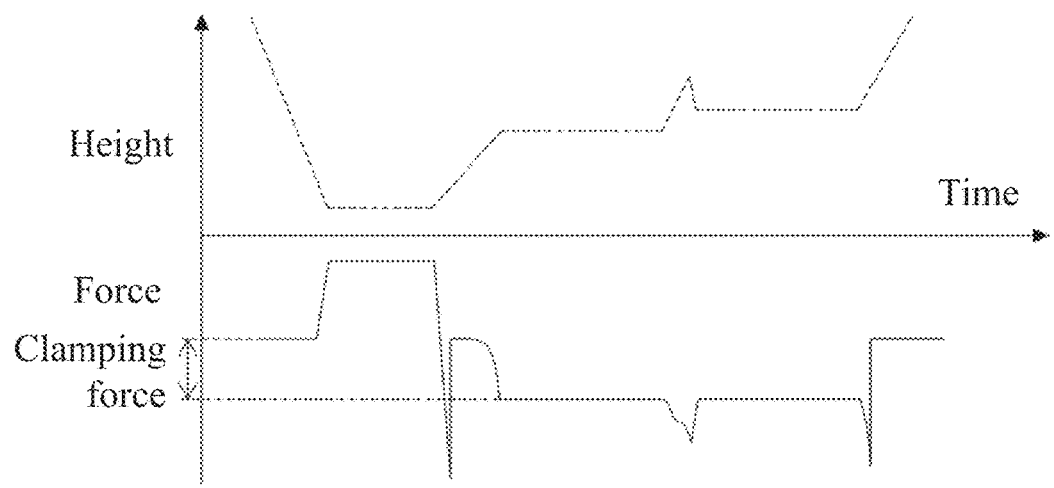
FIG. 8 is a schematic diagram of a multi-level force clamping working mode according to an embodiment of the present disclosure.

Referring to FIG. 8, for the target molecule with mechanochemical response, the operation mode of the M-level clamping force is established. After reaching the clamping force for the first time and the sharp tip undergoes a first holding phase, operation steps of a second stretching phase and a second holding phase are added. If the mechanochemical reaction is triggered in the second stretching phase, the clamping force during the second holding phase is set to be equal in magnitude to the first clamping force during the first holding phase. The infrared absorption in the first and second holding phases can be collected for in-situ mechanochemical identification.

According to the embodiments of the present disclosure, a high-precision, high signal-to-noise ratio AFM infrared spectrometer is first constructed. Then, a novel SMFS collection method is developed. Using the instrument and data collection method, original single-molecule infrared spectral data is obtained. Finally, a background noise removal method is established to achieve simultaneous collection of SMFS and single-molecule infrared spectrum.

In summary, due to the limitations of the instrumentation methods, the SMFS technique cannot directly obtain the chemical information of the target molecule. When the stretched molecule undergoes a length change, it is not possible to determine which chemical bond or supramolecular interaction corresponds to the length change. This present disclosure introduces infrared spectroscopy technology into the SMFS testing process, utilizing the ability of infrared spectroscopy to resolve chemical bonds, thereby achieving the goal of in-situ identification of chemical information changes of the target molecule before and after the mechanochemical reaction. This characterization method significantly enhances the credibility of SMFS experiments by simultaneously and directly displaying the mechanical characteristics of single-chain molecules and single-molecule spectroscopy features. This scientific advancement helps address the confusion caused by the significant differences between the computational results of theoretical chemistry on "isolated molecules" and the experimental spectral results of "aggregated molecules" in real systems. It is of great significance in promoting the development of related fields.

Currently, the development of AFM technology combined with spectroscopy is progressing rapidly, and there is a huge demand for instruments in this research field. However, high-end instruments used by leading research groups, including the basic equipment used for further technological development, are almost entirely monopolized by large foreign companies. The instrument development in the present disclosure combines technological innovation with practical applications. By leading the development of new technologies at key points, it breaks the technical barriers and market monopolies in the field of AFM and spectroscopy coupling imposed by foreign research groups or instrument companies, thus creating instruments with independent intellectual property rights in the same category.

To achieve the above objective, the embodiments of the present disclosure further provide the following technical solutions:

Referring to FIG. 2, an SMFS-IR coupling method includes:

Step S1: Utilize a cantilever to sense and amplify an interaction force between a sharp tip on a cantilever and a polymer molecule under test, to obtain and send a deflection signal of the cantilever.

Step S2: Calculate a resonance frequency from the deflection signal through FFT; and assign the resonance frequency as a pulse repetition frequency to a signal generator.

Step S3: The signal generator generates co-frequency electrical signals based on the pulse repetition frequency; transmits the co-frequency electrical signal as a trigger signal to an infrared laser in the optical path system module; and transmits the co-frequency electrical signal as a reference signal to the lock-in amplifier.

Step S4: Convert a received laser intensity into laser power when collecting background data of the infrared laser.

Step S5: Demodulate the deflection signal of the cantilever according to the reference signal, to obtain a cantilever amplitude, and transmit the cantilever amplitude to the processor module, where the cantilever amplitude represents original spectrum data.

Step S6: Obtain an amplitude-wavenumber curve according to the cantilever amplitude and the laser power; divide the amplitude-wavenumber curve by the background data of the infrared laser, and perform gain adjustment according to a radiation intensity of the infrared laser at each wavenumber segment, to obtain SMFS-IR data of a sample under test; after rupturing the polymer molecule under test, reposition the cantilever to the spatial position during collection of the SMFS-IR data, to collect a photoacoustic noise signal; and normalize the original spectrum data and the pure photoacoustic noise, and perform subtraction to obtain the SMFS-IR data with the photoacoustic noise removed.

Embodiment 1: SMFS-IR Experiment of a Protein

Figure 9:
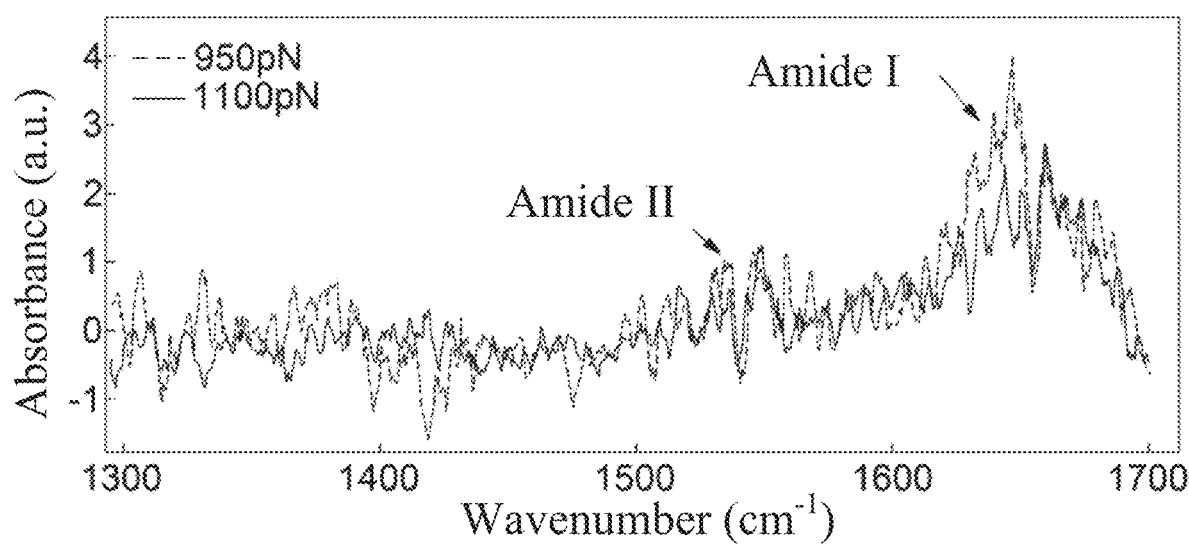
FIG. 9 is an SMFS-IR graph of a protein according to an embodiment of the present disclosure.

Referring to FIG. 9, the protein molecule is connected to the surface of a zinc selenide prism using an interface connection method. The AFM probe forms a covalent bond with the protein, and SMFS-IR signals are collected under different clamping forces. A significant absorption change can be observed around 1630 $cm^{-1}$. A higher mechanical force (1100 pN) results in a lower absorption peak around 1630 $cm^{-1}$, which corresponds to the unfolding of the B-sheet structure of the protein under the mechanical force, leading to a decrease in the signal intensity.

Embodiment 2: SMFS-IR Experiment of a Gem-Dichlorocyclopropane (gDCC)

Figure 10:
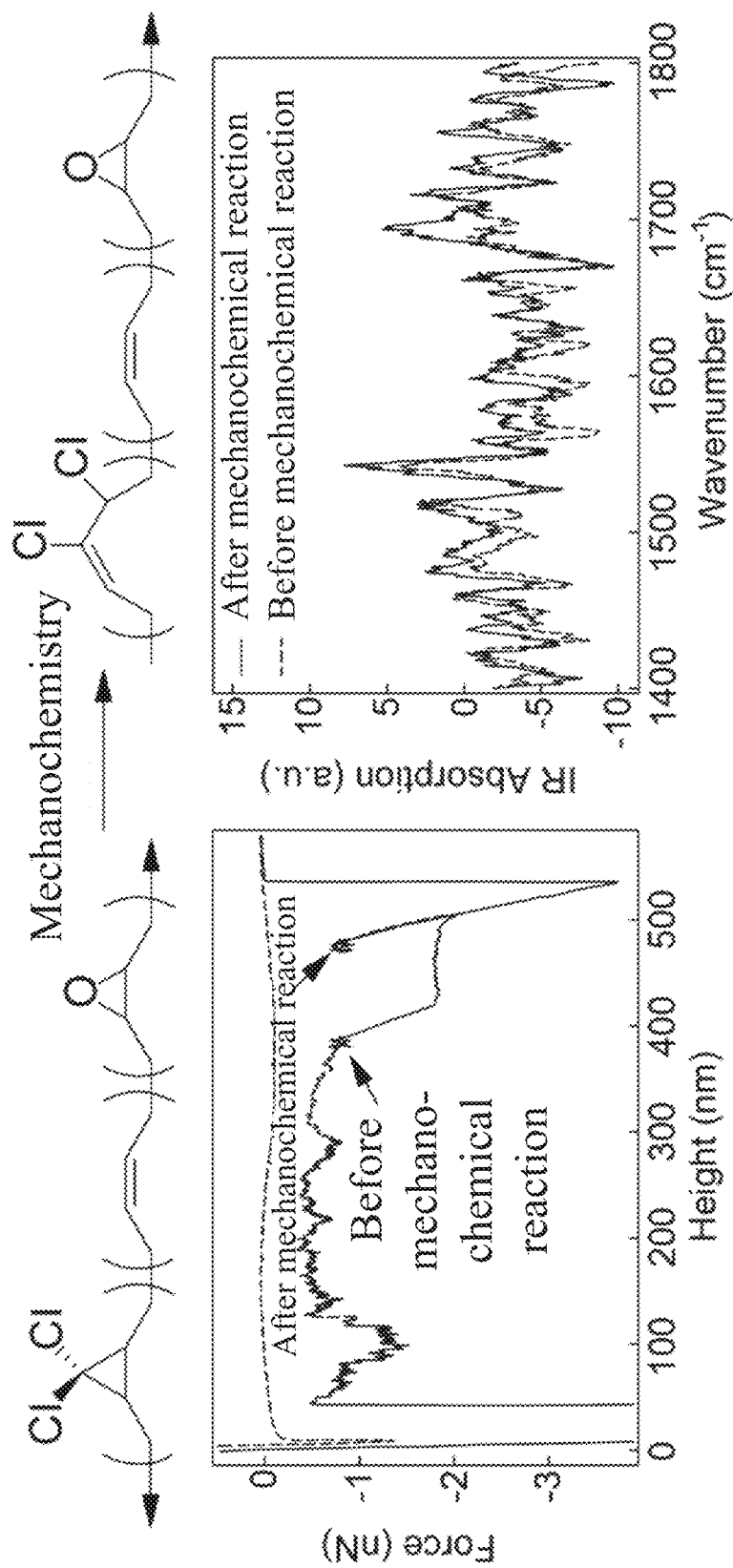
FIG. 10 is an SMFS-IR graph of a gem-dichlorocyclopropane (gDCC) according to an embodiment of the present disclosure.

As shown in FIG. 10, the X-axis represents the height of the cantilever during the force spectroscopy experiment, and the Y-axis represents the force applied to the cantilever. SMFS-IR data of the gDCC is collected using multi-level force spectroscopy. Since the mechanical force threshold for the ring-opening rearrangement of the gDCC structure is 2 nN, infrared spectrum collection is performed at an applied force of 800 pN. The maximum force for secondary stretching of the polymer is set at 2.3 nN. By comparing the infrared spectrum collected before and after the mechanochemical reaction, a new absorption peak appears at 1690 $cm^{-1}$ after the reaction, corresponding to the C=C double bond generated after the ring-opening reaction.

Further, the present disclosure further provides an electronic device. The electronic device may include: a processor, a communication interface, a memory and a communication bus. The processor, the communication interface and the memory communicate with one another by means of the communication bus. The processor can call a computer program in a memory, such that the SMFS-IR coupling method is implemented when the processor executes the computer program.

In addition, the computer program in the above memory may be stored in a computer-readable storage medium when the computer program is implemented in a form of a software function unit and is sold or used as an independent product. On the basis of such understanding, the technical solutions of the present disclosure essentially or the part contributing to the prior art may be embodied in a form of a software product. The computer software product is stored in a storage medium, and includes several instructions for enabling a computer device (which may be a personal computer, a server, a network device, etc.) to execute all or some steps of the methods described in the embodiments of the present disclosure. The above storage medium includes any medium that may store program codes, such as a USB flash drive, a removable hard disk, a read-only memory, a random access memory, a magnetic disk and an optical disc.

Further, the present disclosure provides a non-transient computer storage medium storing a computer program. When the computer program is executed, the SMFS-IR coupling method is implemented.

Each example of the present specification is described in a progressive manner, each example focuses on the difference from other examples, and the same and similar parts between the examples may refer to each other. Since the system disclosed in an embodiment corresponds to the method disclosed in an embodiment, the description is relatively simple, and for related contents, references can be made to the description of the method.

Specific examples are used herein for illustration of principles and embodiments of the present disclosure. The descriptions of the above embodiments are merely used for assisting in understanding the methods and core ideas of the embodiments of the present disclosure. In addition, those of ordinary skill in the art can make various modifications in terms of the particular implementations and the scope of application in accordance with the ideas of the present disclosure. In conclusion, the content of the description shall not be construed as limitations to the embodiments of the present disclosure.

What is claimed is:

1. A single-molecule force spectroscopy-infrared spectroscopy (SMFS-IR) coupling system, comprising:
   an optical path system module configured to utilize a microcantilever to sense and amplify an interaction force between a sharp tip on a cantilever and a polymer molecule under test, to obtain and send a deflection signal of the microcantilever;
   a lock-in amplifier connected to the optical path system module and configured to calculate a resonance frequency from the deflection signal through fast Fourier transform (FFT);
   a processor module connected to the lock-in amplifier and configured to assign the resonance frequency as a pulse repetition frequency to a signal generator;
   the signal generator connected to the processor module and configured to:
     generate co-frequency electrical signals based on the pulse repetition frequency;
     transmit the co-frequency electrical signal as a trigger signal to an infrared laser in the optical path system module; and transmit the co-frequency electrical signal as a reference signal to the lock-in amplifier; and
a photothermal detector connected to the infrared laser in the optical path system module and the lock-in amplifier and being configured to:
convert a received laser intensity into laser power when collecting background data of the infrared laser; and
transmit the laser power to the lock-in amplifier, wherein the lock-in amplifier transmits the laser power to the processor module;
the lock-in amplifier is further configured to: demodulate the deflection signal of the microcantilever according to the reference signal, obtain a microcantilever amplitude, and transmit the microcantilever amplitude to the processor module, wherein the microcantilever amplitude represents original spectrum data; and
the processor module obtains an amplitude-wavenumber curve according to the microcantilever amplitude and the laser power; divides the amplitude-wavenumber curve by the background data of the infrared laser, and performs gain adjustment according to a radiation intensity of the infrared laser at each wavenumber segment, to obtain SMFS-IR data of a sample under test; wherein the original spectrum data is collected when the sharp tip is connected to a target molecule of the polymer molecule under test; after the collection is completed, the target molecule is ruptured, and the sharp tip is controlled to move to a position for spectral signal collection, to collect signals again and obtain a pure photoacoustic noise;
the original spectrum data and the pure photoacoustic noise are normalized, and subtraction is performed to obtain the SMFS-IR data with the photoacoustic noise removed;
after the sharp tip is connected to the target molecule of the polymer molecule under test, a first clamping force is preset; when a force on the sharp tip reaches the first clamping force, a process of moving the sharp tip away is stopped, and the sharp tip is held in place;
during a holding phase, the sharp tip performs intervention of an infrared laser light and collects infrared spectrum data;
after completing the collection of the infrared spectrum data, the sharp tip continues to move away from the target molecule of the polymer molecule under test until the target molecule is ruptured; and
for a target molecule with mechanochemical response, an M-level clamping force is preset after the sharp tip is connected to the target molecule of the polymer molecule under test, specifically comprising:
when the force on the sharp tip reaches the first clamping force and the sharp tip undergoes a first holding phase, continuing operation steps of a second stretching phase and a second holding phase; if a mechanochemical reaction is triggered during the second stretching phase, setting a second clamping force during the second holding phase to be equal in magnitude to the first clamping force during the first holding phase; and
performing, by the sharp tip, intervention of the infrared laser light and collecting the infrared spectrum data during both the first holding phase and the second holding phase, to obtain an in situ mechanochemical identification result.

2. The SMFS-IR coupling system according to claim 1, wherein the optical path system module comprises:
the infrared laser configured to emit infrared laser light;
a guiding laser light emitter configured to emit guiding laser light;
a plane mirror unit disposed in an optical path of the infrared laser light and configured to control a spatial position of the infrared laser light;
a beam combiner disposed in a common optical path of the infrared laser light and the guiding laser light and configured to adjust the guiding laser light and the infrared laser light to be collinear, to obtain collinear laser light;
a reflective beam expander disposed in an optical path of the collinear laser light and configured to expand the collinear laser light, to obtain N-fold expanded laser light; and
an off-axis parabolic mirror movable in three-dimensional space, disposed in an optical path of the expanded laser light, and configured to focus the N-fold expanded laser light onto a surface of an infrared-transparent prism carrying the sample under test, wherein the infrared-transparent prism comprises at least a zinc selenide infrared-transparent glass, a zinc sulfide infrared-transparent glass, a calcium fluoride infrared-transparent glass, a magnesium fluoride infrared transparent glass, or a potassium bromide infrared-transparent glass.

3. The SMFS-IR coupling system according to claim 2, wherein the optical path system module further comprises:
a turning mirror disposed in the optical path of the collinear laser light and configured to directly reflect the collinear laser light to the photothermal detector.

4. A single-molecule force spectroscopy-infrared spectroscopy (SMFS-IR) coupling method, applied to the SMFS-IR coupling system of claim 1, comprising:
utilizing a microcantilever to sense and amplify an interaction force between a sharp tip on a cantilever and a polymer molecule under test, to obtain and send a deflection signal of the microcantilever;
calculating a resonance frequency from the deflection signal through fast Fourier transform (FFT); and assigning the resonance frequency as a pulse repetition frequency to a signal generator;
generating, by the signal generator, co-frequency electrical signals based on the pulse repetition frequency; transmitting the co-frequency electrical signal as a trigger signal to an infrared laser in an optical path system module; and
transmitting the co-frequency electrical signal as a reference signal to a lock-in amplifier;
converting a received laser intensity into laser power when collecting background data of the infrared laser;
demodulating the deflection signal of the microcantilever according to the reference signal, to obtain a microcantilever amplitude, and transmitting the microcantilever amplitude to a processor module, wherein the microcantilever amplitude represents original spectrum data; and
obtaining an amplitude-wavenumber curve according to the microcantilever amplitude and the laser power; dividing the amplitude-wavenumber curve by the background data of the infrared laser, and performing gain adjustment according to a radiation intensity of the infrared laser at each wavenumber segment, to obtain SMFS-IR data of a sample under test.

5. An electronic device, comprising a memory, a processor, and a computer program stored in the memory and executable in the processor, wherein the processor executes the computer program to implement the SMFS-IR coupling method according to claim 4.

6. A non-transitory computer-readable storage medium, storing a computer program, wherein the computer program is executed to implement the SMFS-IR coupling method according to claim 4.

7. The single-molecule force spectroscopy-infrared spectroscopy (SMFS-IR) coupling method according to claim 4, wherein the optical path system module specifically comprises:
- the infrared laser configured to emit infrared laser light;
- a guiding laser light emitter configured to emit guiding laser light;
- a plane mirror unit disposed in an optical path of the infrared laser light and configured to control a spatial position of the infrared laser light;
- a beam combiner disposed in a common optical path of the infrared laser light and the guiding laser light and configured to adjust the guiding laser light and the infrared laser light to be collinear, to obtain collinear laser light;
- a reflective beam expander disposed in an optical path of the collinear laser light and configured to expand the collinear laser light, to obtain N-fold expanded laser light; and
- an off-axis parabolic mirror movable in three-dimensional space, disposed in an optical path of the expanded laser light, and configured to focus the N-fold expanded laser light onto a surface of an infrared-transparent prism carrying the polymer molecule under test, wherein the infrared-transparent prism comprises at least a zinc selenide infrared-transparent glass, a zinc sulfide infrared-transparent glass, a calcium fluoride infrared-transparent glass, a magnesium fluoride infrared transparent glass, or a potassium bromide infrared-transparent glass.

8. The single-molecule force spectroscopy-infrared spectroscopy (SMFS-IR) coupling method according to claim 7, wherein the optical path system module further comprises:
- a turning mirror disposed in the optical path of the collinear laser light and configured to directly reflect the collinear laser light to the photothermal detector.

9. An electronic device, comprising a memory, a processor, and a computer program stored in the memory and executable in the processor, wherein the processor executes the computer program to implement the SMFS-IR coupling method according to claim 7.

10. An electronic device, comprising a memory, a processor, and a computer program stored in the memory and executable in the processor, wherein the processor executes the computer program to implement the SMFS-IR coupling method according to claim 8.

11. A non-transitory computer-readable storage medium, storing a computer program, wherein the computer program is executed to implement the SMFS-IR coupling method according to claim 7.

12. A non-transitory computer-readable storage medium, storing a computer program, wherein the computer program is executed to implement the SMFS-IR coupling method according to claim 8.

\* \* \* \* \*